July 15, 1930. H. C. RANEY 1,770,660
WOVEN WIRE FENCE STRETCHER
Filed March 7, 1929 3 Sheets-Sheet 3
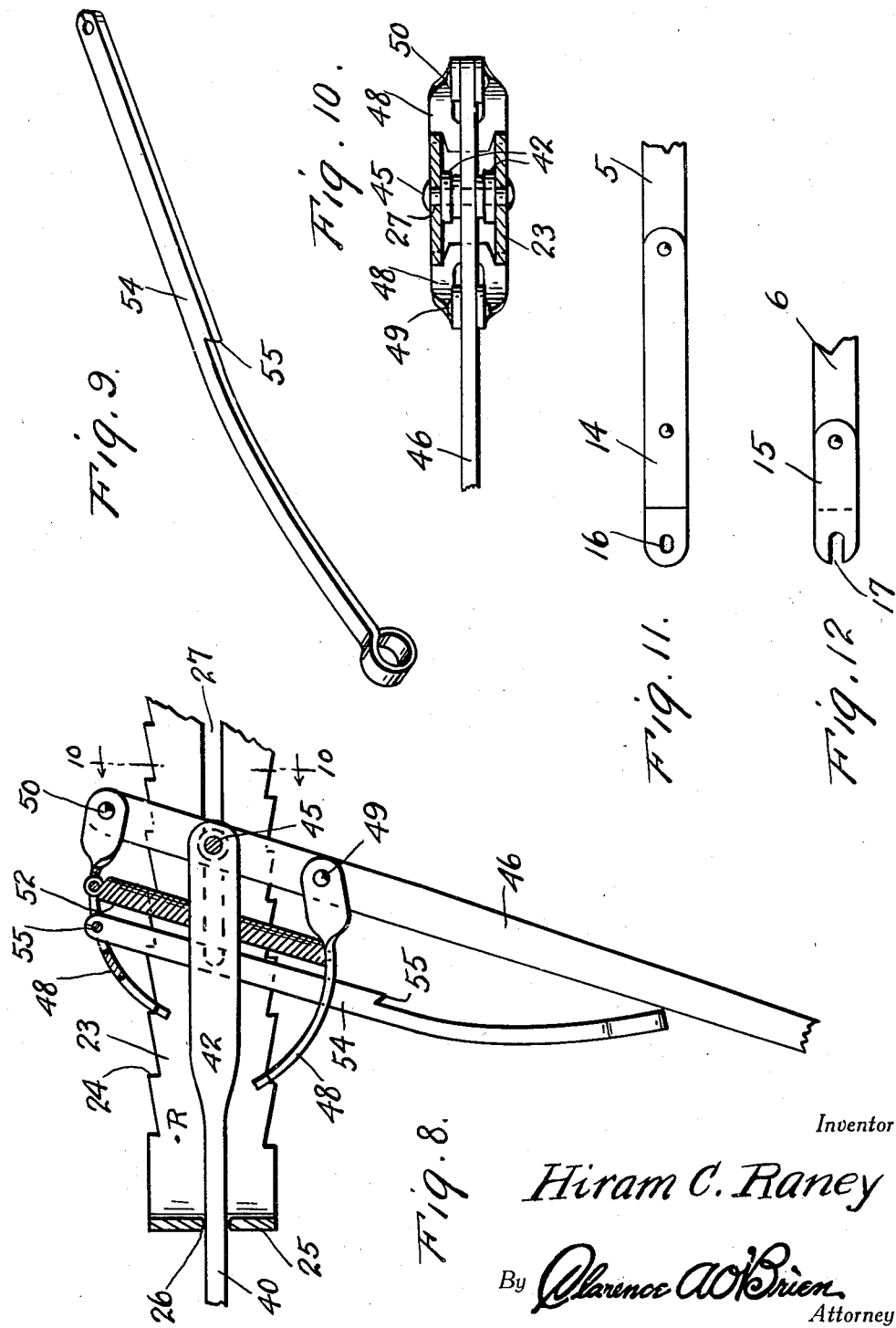
Inventor
Hiram C. Raney
By Clarence A. O'Brien
Attorney Patented July 15, 1930

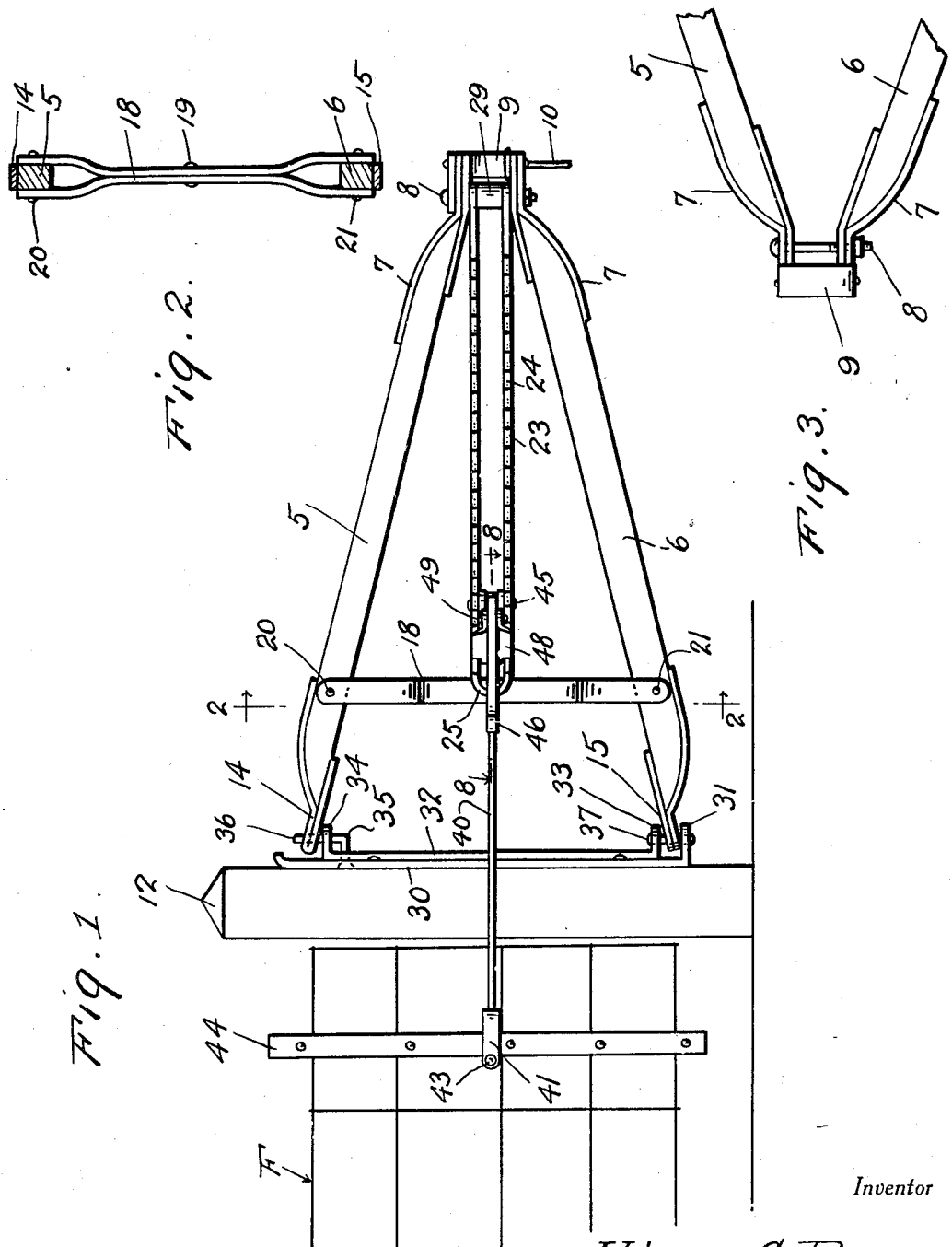

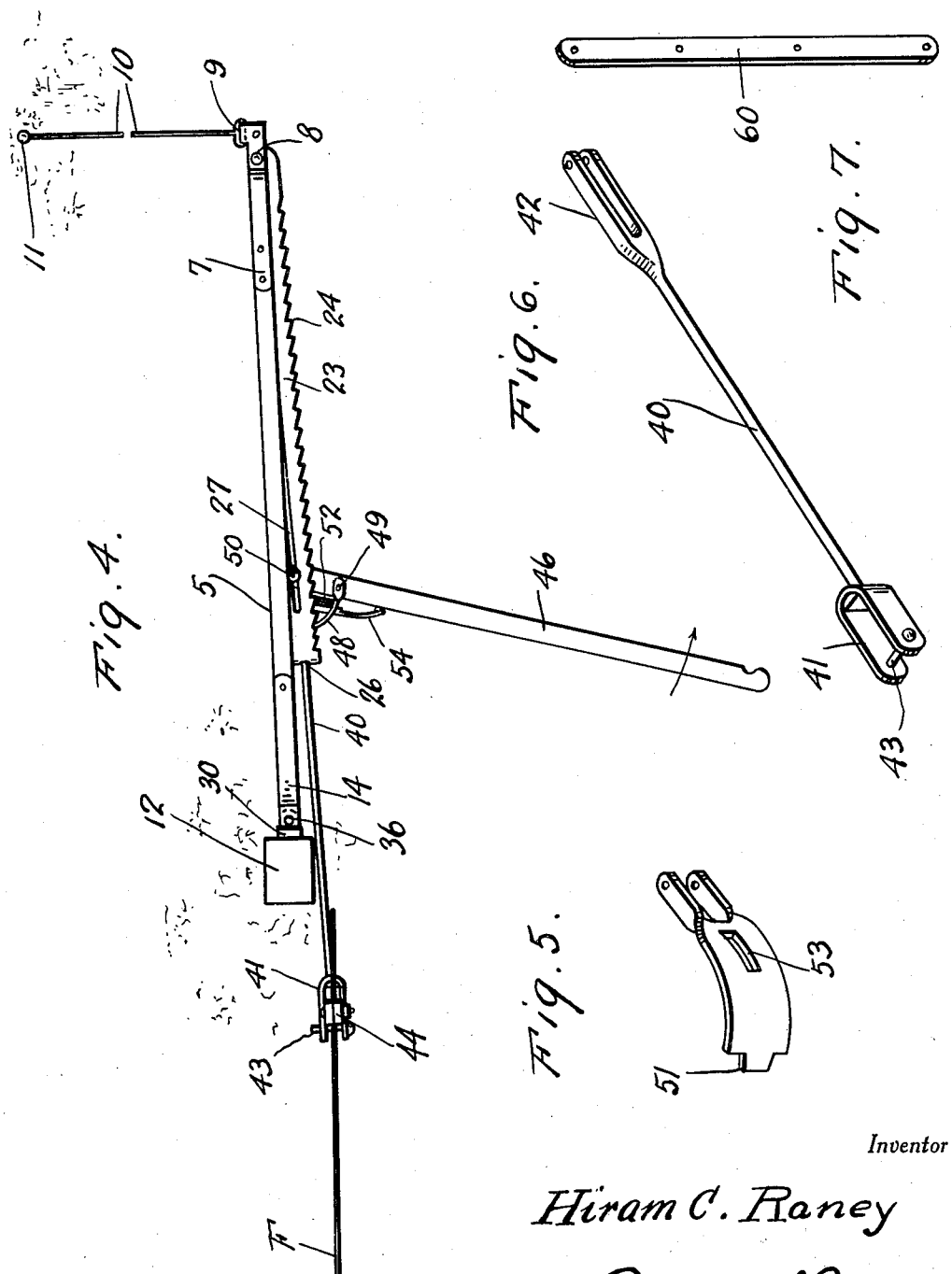

1,770,660

UNITED STATES PATENT OFFICE

HIRAM C. RANEY, OF KANSAS CITY, MISSOURI

WOVEN-WIRE-FENCE STRETCHER

Application filed March 7, 1929. Serial No. 345,103.

The present invention relates to a woven wire fence stretcher and has for its prime object to provide a mechanism for stretching the fence between the last two fence posts of a row of fence posts and the main characteristics of the mechanism resides in the simplicity, efficiency and reliability of the device.

Another very important object of the invention resides in the provision of an apparatus of this nature which is easy to manipulate, compact and convenient in its arrangement of parts, easy to set up, not likely to easily become out of order, and inexpensive to manufacture.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the apparatus showing the same in use,

Figure 2 is a detail section taken substantially on the line 2—2 of Figure 1,

Figure 3 is a detail view showing the end of the main frame,

Figure 4 is a top plan view of the apparatus,

Figure 5 is a perspective view of one of the pawls,

Figure 6 is a perspective view of a connecting link,

Figure 7 is a perspective view of a bar for attaching the end of the fence to the end fence post, Figure 8 is an enlarged detail section taken substantially on the line 8—8 of Figure 1, Figure 9 is a perspective view of the pawl releasing rod, Figure 10 is a sectional view taken substantially on the line 10—10 of Figure 8, Figure 11 is a detail view of one frame end bracket, Figure 12 is a similar view of another end frame bracket.

Referring to the drawing in detail it will be seen that a frame is formed by a pair of bars 5 and 6 which diverge from each other in one direction so as to be obliquely disposed in respect to each other.

The closer ends of the bars are fixed in brackets 7 attached together by a bolt 8 so as to be in spaced relationship and the extremities of these brackets are engaged with a clevis 9 from which extends a rope or cable 10 attached to a post, peg or the like 11 driven into the ground out of alinement with the row of fence posts, the end one of which is indicated in the present illustration of the invention by the numeral 12.

On the farther apart spaced ends of the bars 5 and 6 are brackets 14 and 15 respectively, the former of which has an opening 16 in its extremity and the latter of which has a notch 17 in its extremity. A pair of rods 18 are secured together at their centers as is indicated at 19 while their ends are spaced to straddle the bars 5 and 6 and to be attached thereto as is indicated at 20 and 21 respectively adjacent the farthest spaced ends of said bars 5 and 6.

An elongated ratchet member R is constructed in U-shaped formation to comprise a pair of elongated sides 23 having ratchet teeth 24 on the edges thereof and connected at adjacent ends by bite 25 with an opening 26 therein. These sides 23 are longitudinally slotted as is indicated at 27. The extremities of the sides 23 have openings to receive the bolt 8 which extends through a spacer 29 between the brackets 7 on the sides 23.

An elongated plate 30 is mounted on the side of the post 12 and at its bottom end is provided with a laterally extending ear 31. An elongated plate 32 is attached on the plate 30 and has an ear 33 spaced upwardly from the ear 31 and at its upper end is provided with an ear 34 in parallelism with the ears 33 and 31.

A pin attached to the plates 30 and 32 is denoted by the numeral 35 and has an upwardly extending extension 36 through the ear 34 to extend through opening 16 of the bracket 14. A pin 37 extends through the ears 31 and 33 to be received in the notch 17 in the bracket 15.

Thus the frame is mounted on the post to extend away from the fence which is denoted by the letter F. The peg 11 and cable 10 prevents the frame from swinging in a clockwise direction as illustrated in Figure 4. A link 40 has a yoke 41 at one end and a yoke 42 at the other end. This link 40 extends through the opening 26 and the yoke 40 has a pin extending across the extremities thereof as illustrated at 43 so that the clamp 44 on the fence F may be held in the yoke.

The yoke 42 has pivoted between its extremities by means of a pin 45 a lever 46. This pin 45 extends through the slots 27 and is located adjacent one end of the lever.

A pair of pawls 48 are pivotally engaged as at 49 and 50 with the lever 46 so that the pivots are located one to each side and equidistant from the pin 45. These pawls are curved and have reduced extremities 51 to engage ratchet teeth 24 being held in engagement therewith by a spring 52 connected to the pawls.

The pawls are provided with slots 53 and a rod 54 has an end pivotally mounted as at 55 in one slot 53 while an intermediate portion of the rod passes through the other slot 53. Intermediate the ends of this rod there is formed a shoulder 55.

Obviously, by referring to Figure 8, it will be seen that by pushing the rod 54 to free the upper pawl 48, the shoulder may be engaged with one end edge of the slot 53 of the lower pawl and thus both pawls held out of engagement with the ratchet teeth 24 when it is desired.

From the above detailed description of the parts it will be seen that the pawls 48 will first be freed from the ratchet teeth 24 and then the yoke 41 will be engaged with the clamp 44 of the fence F. Then the pawls 48 will be released so that the spring 52 holds them in engagement with the ratchet teeth. Then by rocking the lever 46 it will be seen that the link 40 will be moved to the right of Figures 1, 4 and 8 thereby stretching the fence F until the end thereof reaches the post 12 at which time the end may be secured to the post by means of a bar or rod 60 instead of staples if so desired.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A stretching apparatus of the class described comprising a frame, a U-shaped member including elongated sides connected by a curved portion, means for pivotally mounting the extremities of the sides in the frame, said sides having ratchet teeth on the edges thereof, said sides being slotted, a lever, a link pivotally connected with the lever by means of a pin extending through the slots, said link extending through an opening in the curved portion, pawls pivotally mounted on the lever one to each side of said pivot pin, a spring connecting the pawls to hold the ends thereof normally in engagement with the ratchet teeth, said frame comprising a pair of obliquely disposed bars, rods holding the bars together, brackets at the ends of the bars, a pin connecting one pair of brackets at the closer ends of the bars and a clevis engaged on said last mentioned brackets, a supporting structure for attachment to a fence post having a pair of pins, the other brackets on the bars being formed one with an opening to receive the upper pin on the supporting structure and the other with a notch to receive the lower pin on the supporting structure.

2. A stretching apparatus of the class described comprising a frame, a U-shaped member including elongated sides connected by a curved portion, means for pivotally mounting the extremities of the sides in the frame, said sides having ratchet teeth on the edges thereof, said sides being slotted, a lever, a link pivotally connected with the lever by means of a pin extending through the slots, said link extending through an opening in the curved portion, pawls pivotally mounted on the lever one to each side of said pivot pin, a spring connecting the pawls to hold the ends thereof normally in engagement with the ratchet teeth, said pawls having slots therein, a rod having an end pivoted in one slot of one pawl and passing through the slot of the other pawl and formed with a shoulder whereby when said other pawl has the edge of its slot engaged with the shoulder said pawls are held out of engagement with the ratchet teeth, a supporting structure for attachement to a fence post having a pair of pins, and brackets on the frame being formed one with an opening to receive the upper pin on the supporting structure and the other with a notch to receive the lower pin on the supporting structure.

In testimony whereof I affix my signature.

HIRAM C. RANEY.